United States Patent
Athreya et al.

(10) Patent No.: US 7,088,714 B2
(45) Date of Patent: Aug. 8, 2006

(54) SYSTEM AND METHOD FOR CONNECTING GEOGRAPHICALLY DISTRIBUTED VIRTUAL LOCAL AREA NETWORKS

(75) Inventors: Anand S. Athreya, San Jose, CA (US); Nicholas M. Brailas, San Jose, CA (US); Alampoondi E. Natarajan, San Jose, CA (US); Nehal Bhau, San Jose, CA (US)

(73) Assignee: Tasman Networks, Inc, San Jose, CA (US)

( * ) Notice: Subject to any disclaimer, the term of this patent is extended or adjusted under 35 U.S.C. 154(b) by 887 days.

(21) Appl. No.: 09/938,474

(22) Filed: Aug. 23, 2001

(65) Prior Publication Data

US 2002/0027906 A1 Mar. 7, 2002

Related U.S. Application Data

(60) Provisional application No. 60/227,862, filed on Aug. 24, 2000.

(51) Int. Cl.
*H04L 12/50* (2006.01)
*H04L 12/46* (2006.01)

(52) U.S. Cl. .................. 370/389; 370/390; 370/401; 370/432

(58) Field of Classification Search ................ 370/386, 370/389, 390, 395.53, 401, 432; 709/204, 709/223, 224
See application file for complete search history.

(56) References Cited

U.S. PATENT DOCUMENTS

| | | | |
|---|---|---|---|
| 6,151,322 A | 11/2000 | Viswanath et al. | |
| 6,157,647 A | 12/2000 | Husak | |
| 6,181,694 B1 | 1/2001 | Pickett | |

OTHER PUBLICATIONS

RFC2878 pp. 1-17,, Cisco, Jul. 2000, downloaded from the Internet RFC/STD/FYI/BCP Archives.
IEEE Standards for Local and Metropolitan Area Networks: Virtual Bridged Local Area Networks, 1999.

*Primary Examiner*—Afsar Qureshi
(74) *Attorney, Agent, or Firm*—Paul Davis; Heller Ehrman LLP

(57) ABSTRACT

A VLAN tagging unit associated with a WAN is used to add VLAN tags based upon logical interfaces. In one example, data received across the logical interface is tagged with an associated VLAN ID by the unit. In another embodiment, flow-based VLAN tagging is done in which in addition to the logical interface other indications are used in the VLAN tagging.

50 Claims, 16 Drawing Sheets

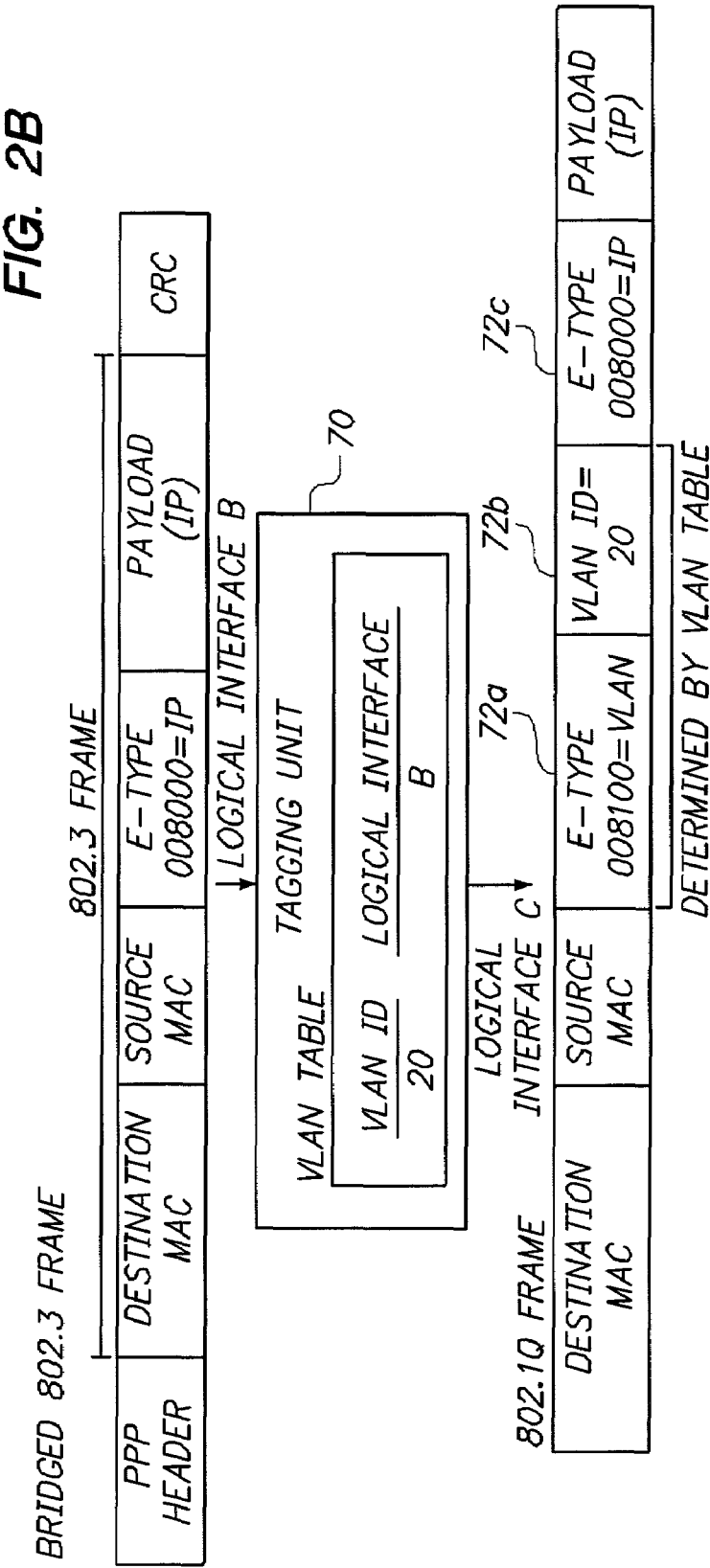

FIG. 6

VLAN TABLE

| VLAN ID | ASSOCIATED LOGICAL INTERFACES | |
|---|---|---|
| | WAN | LAN |
| 10 | A, C | D |
| 20 | B | D |

FIG. 7

VLAN TABLE

| VLAN ID | ASSOCIATED LOGICAL INTERFACES | | FLOW INDICATION | QOS |
|---|---|---|---|---|
| | WAN | LAN | | |
| 30 | E, F | G | IP SUBNET A | |
| 40 | E, F | G | IP SUBNET B | |

VLAN TABLE

- VLAN ID
- ASSOCIATED LOGICAL INTERFACES
- FLOW INDICATION
- SERVICE INDICATION
  - QOS
  - TRANSLATION
  - ENCRYATION
- NETWORK ADDRESS TRANSLATION INDICATION

*FIG. 8*

VLAN TAGGING UNIT — 140

- VLAN TAGGING
- MULTILINK FUNCTIONS
- IP MULTIPLEXING
- SOME ROUTER FUNCTIONS
- VLAN BASED SERVICES
- QOS
- NAT
- VLAN ID BASED MANAGERMENT

AGGREGATED VIRTUAL CIRCUIT
VIRTUAL CIRCUIT
T1
MULTILINK COMBINED T1
FRACTIONAL T1
ETHERNET

LOGICAL INTERFACES 142

*FIG. 9*

*VLAN Forwarding Table Sample Output*
*Tiara/configure/vlanfwd>display vlanfwd table*

*Vlan Ether Type — 33024(0x8100)*

*Vlan Forwarding Table —*

| Interface Name | Vlan Id |
|---|---|
| ethernet0 | 100–120, 500, 4095 |
| ethernet1 | 1–500, 600, 1000 |

*VLAN Forwarding Statistics Sample Output*
*Tiara/configure/vlanfwd>display vlanfwd statistics*

*Vlan Forwarding Statistics —*

Vlan Forwarding — ENABLED
Vlan Ether Type — 33024(0x8100)

*Vlan Id: (4091)*

Outgoing Vlan Packets: 500
Incoming Vlan Packets: 500
Dropped Vlan Packets: 0

*Vlan Id: (4092)*

Outgoing Vlan Packets: 2000
Incoming Vlan Packets: 2000
Dropped Vlan Packets: 0

*Vlan Id: (4093)*

Outgoing Vlan Packets: 10
Incoming Vlan Packets: 10
Dropped Vlan Packets: 0

FIG. 11

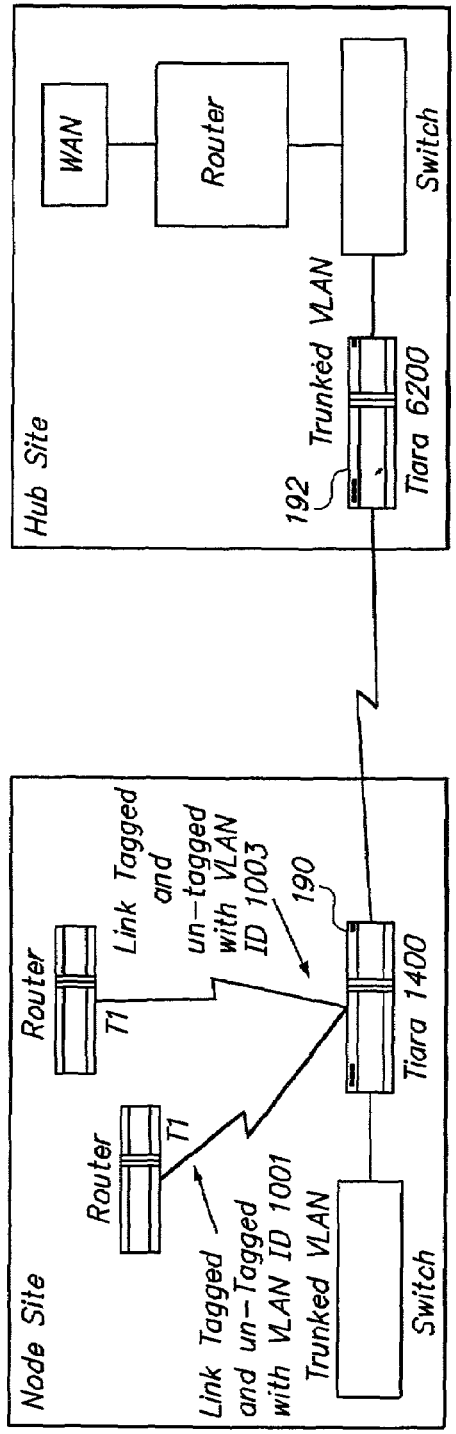
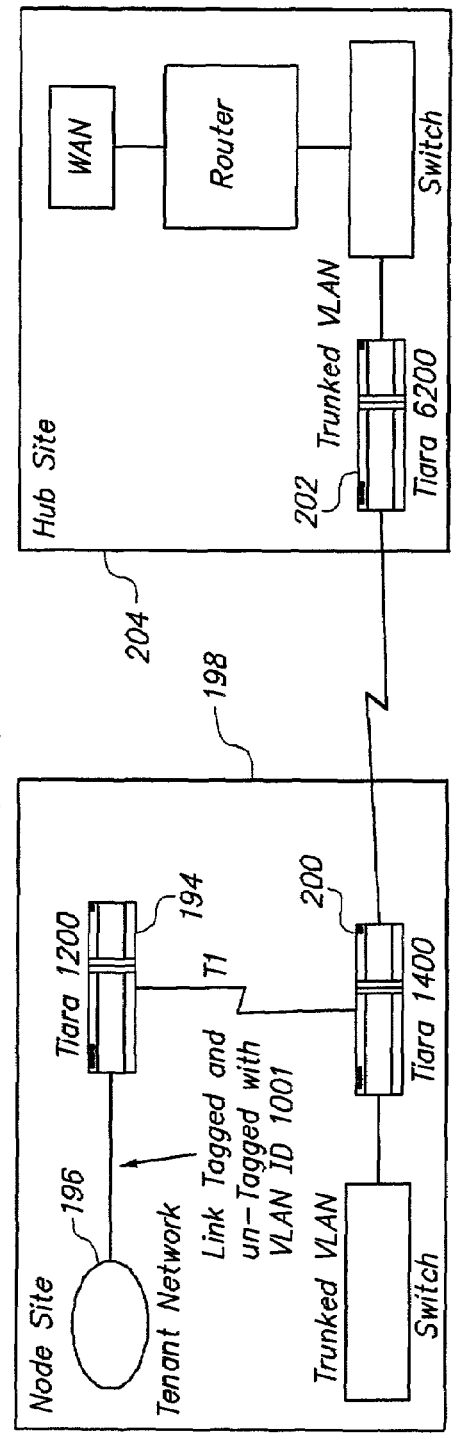

SYSTEM AND METHOD FOR CONNECTING GEOGRAPHICALLY DISTRIBUTED VIRTUAL LOCAL AREA NETWORKS

RELATED APPLICATION

This application claims priority under 35 U.S.C. § 119(e) to U.S. Provisional Patent Application No. 60/227,862, filed Aug. 24, 2000.

BACKGROUND OF THE INVENTION

The present invention relates to Virtual Local Area Networks (VLANs). VLANs allow multiple community groups to coexist within one bridge. A bridging community is identified by its VLAN ID. As described in IEEE 802.1q standard, if a system that supports VLANs receives a frame from the LAN, the frame will only be admitted to a LAN which belongs to the same community. A disadvantage of the VLAN standard 802.1q is that it does not support interactions over Wide Area Networks (WANs). It is desired to have a VLAN supported over a wide area network because it would allow the logical grouping of resources between a customer premise equipment (CPE) location and a point of presence (POP) location.

For this reason, it is desired to have systems and apparatus that support VLANs over wide area networks.

SUMMARY OF THE INVENTION

The present invention comprises a unit that allows VLANs to extend over wide area networks. In one embodiment, the VLAN frames are bridged and sent to another VLAN segment across the WAN. This bridging embodiment has a number of disadvantages. First, the bridging adds to the overhead of the data transfer over the WAN. Additionally, the use of bridging reduces the flexibility of the transmissions over the WAN.

In a preferred embodiment, a unit provides VLAN ID tagging based on a logical interface at the unit. The logical interface can be a physical interface, such as a T1 or Ethernet port, multi-link combination of physical connections, such as multi-linked T1s, or virtual connections, such as a virtual circuit, or an aggregated virtual circuit. Other possible logical interfaces include DS3, CT3, and E1. VLAN tables stored in the unit associate VLAN IDs with logical interfaces of the unit. In one embodiment, when data is received at a logical interface and the VLAN tagging is enabled, the data is tagged with the VLAN ID to send to a VLAN on the other side of the LAN interface. Thus, the VLAN ID need not be sent over the WAN, reducing the WAN data transfer overhead.

Another embodiment of the present invention comprises a VLAN tagging unit having multiple logic interfaces. Different logical interfaces on the VLAN tagging unit are associated with different customer networks. The customer networks transmits data to the VLAN tagging unit across a WAN. The VLAN tagging unit produces a VLAN ID for data associated with a customer network. The production depends at least partially on the logical interface of the VLAN tagging unit on which the data is received. The VLAN tagging unit uses the VLAN ID to produce VLAN frames to send to additional networks elements. Data is explicitly combined with the VLAN ID only after the VLAN tagging unit tags the data with the VLAN ID.

In another embodiment, the customer networks do include a VLAN ID such that data is sent in VLAN frames, including the VLAN ID. In one embodiment, another VLAN tagging unit strips the VLAN information from the data before sending it to the first VLAN tagging unit across a WAN.

In another embodiment of the present invention the production of the VLAN ID further depends upon other information such that multiple VLAN IDs can be used for data received at the same logical interface. This allows the unit to associate flows coming to the unit with different VLAN IDs, such that the element in the network associate with the unit can handle the flows differently.

Another embodiment of the present invention comprises a system including a customer network using a first VLAN ID. A first VLAN tagging unit is adapted to convert VLAN frames into data in a format without a VLAN ID. The data in the format without the VLAN ID is sent across the WAN to a second VLAN tagging unit. The second VLAN tagging unit converts the data in the format without a VLAN ID into VLAN frames with a second VLAN ID. The first and second VLAN IDs need not be the same. One way to implement such a system is to use Internet Protocol (IP) multiplexing such that networks elements on the LANs associated with the first and second tagging units are given a spoofed medium access (MAC) addresses, the spoofed MAC addresses corresponding to a WAN interface connection for the units. Network elements in the local area networks address the units with the spoofed address, the units using the spoofed address to determine what WAN interface to send the data in the format without the VLAN ID. The second VLAN tagging unit receives the data without the VLAN ID and adds a VLAN ID to form VLAN frames according to the VLAN table in the second VLAN tagging unit.

Another embodiment of the present invention concerns a unit associated with customer networks and at least one WAN. The customer networks are associated with different logical interfaces on the unit. The customer networks need not be directly connected to those interfaces. The unit allows the transfer of data associated with a VLAN across the WAN. The unit maintains a table of VLAN IDs, and associated logical interfaces, such that when data associated with the VLAN is received, it can be forwarded to each of the associated logical interfaces other than the logical interface on which the data is received. This allows the unit to transmit the VLAN frames onto the multiple interfaces when the VLAN ID is associated with multiple interfaces.

Another embodiment of the present invention concerns a unit associated with customer networks and at least one WAN. Different logical interfaces on the unit being associated with different customer networks. The unit allowing transfer of data associated with VLAN across the WAN. The unit maintaining a VLAN table of VLAN IDs, logical interfaces associated with each VLAN ID, and at least one service parameter. Based on the VLAN ID, the unit is adapted to use a surface parameter to affect data transferred from the unit. The service parameter can be a quality of service (QOS) indication, a translation indication, a compression indication, an encapsulation indication, an encryption indication or another processing indication.

Still yet another embodiment of the present invention concerns a unit associated with at least one WAN. Different logical interfaces on the unit being associated with different customer networks. The unit allowing transfer of data associated with the VLAN across the WAN. The unit maintaining a table of VLAN IDs, and at least one associated quality of service indication. Data from the multiple VLANs having different VLAN IDS are sent across the same WAN connection. The quality of service indication determines how bandwidth is divided between the VLANs. In one embodiment, the quality of service indication includes a committed information rate (CIR) indication, an indication of the e burst rate, and policing policy indication. The quality of service indications can also be a prioritization indication that allows the prioritization of data being sent across the WAN.

Still yet another embodiment of the present invention concerns a unit associated with a customer network and at least one WAN. Different logical interfaces on the unit being associated with different customer networks. The unit maintains a table of VLAN IDs and associated logical interfaces. The VLAN table also contains Internet Protocol (IP) addresses associated with the different logical interfaces such that a network address translation of IP addresses is done at least in part due to the logical interface from which the data is received. In one embodiment, this translation comprises network address translation (NAT). In one embodiment, this translation is an IP version 4 to IP version 6 addresses translation.

Still yet another of the present invention concerns a system in which at least one VLAN ID is a management ID that allows the management of network elements, such that elements associated with other VLAN IDs cannot access the management functions. In one embodiment, connectivity is checked using the management VLAN ID. In another embodiment, the unit converts non-VLAN ID-based management instructions to VLAN ID-based management instructions.

Still yet another embodiment of the present invention comprises a system in which a VLAN ID table in the unit is updated dynamically during the operation of the unit. In one embodiment, this dynamic updating is done by examining the VLAN IDs of data being transferred through the unit along with the logical interfaces of the incoming data. In one embodiment, the test messages are broadcast across the logical interfaces in order to get responses for this dynamic update. In another embodiment, the VLAN ID table is dynamically updated by obtaining VLAN ID table information from other units in a management function.

BRIEF DESCRIPTION OF THE DRAWING FIGURES

FIG. 2B is a diagram that illustrates the operation of the tagging unit of FIG. 2A in converting bridged 802.3 frames into 802.1q frames.

FIG. 6 is a diagram that illustrates a VLAN table for the embodiment of FIG. 5.

FIG. 7 is a VLAN table of one embodiment of the present invention.

FIG. 8 is a diagram that illustrates a VLAN table of another embodiment of the present invention.

FIG. 9 is a diagram that illustrates a VLAN tagging unit of one embodiment of the present invention.

FIG. 11 is a diagram illustrating the output of a VLAN forwarding table content request and a VLAN forwarding statistics sample output for one embodiment of the present invention.

FIG. 13 is a diagram that illustrates another embodiment of the system of the present invention.

FIG. 14 is a diagram that implements still another embodiment of the system of the present invention.

DETAILED DESCRIPTION OF THE PREFERRED EMBODIMENT

Figure 1A:
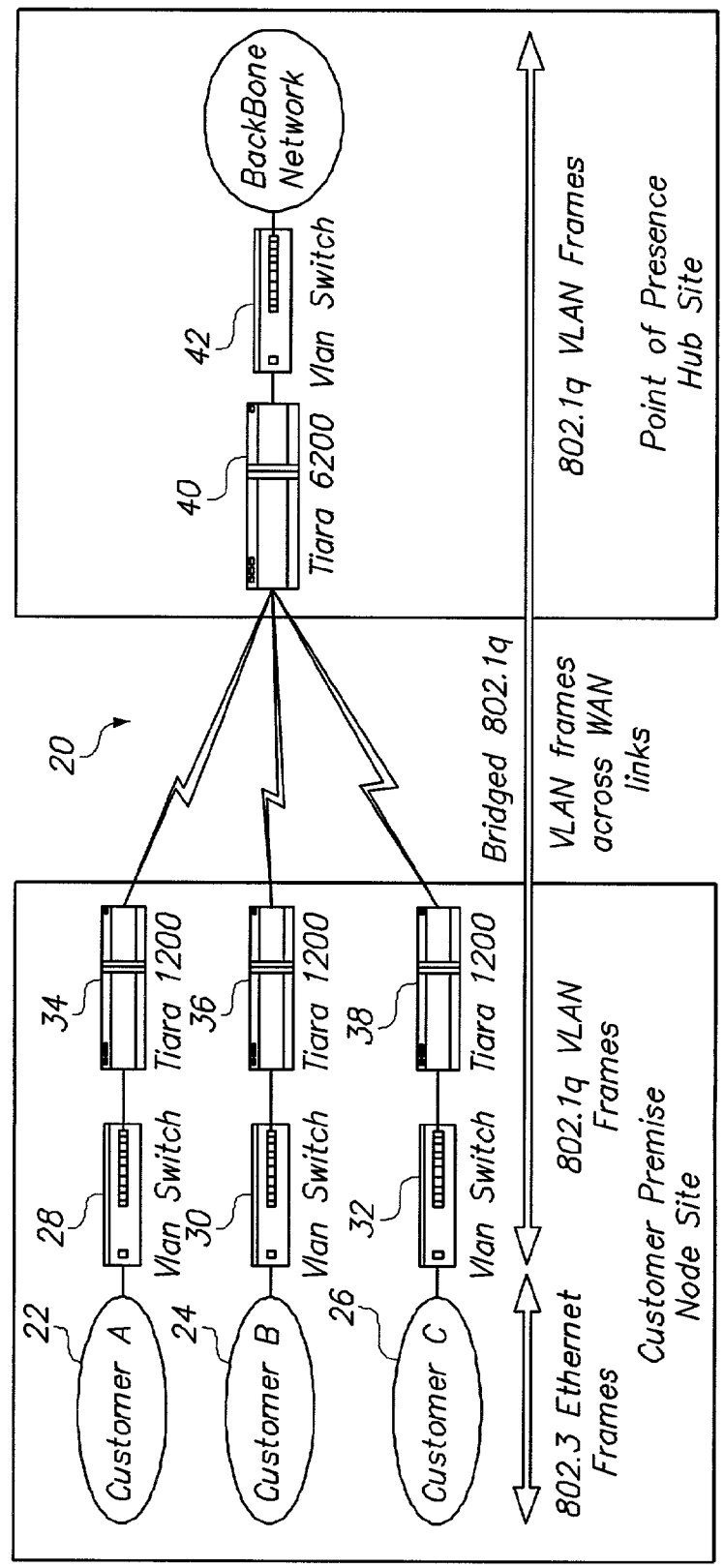
FIG. 1A is a diagram that illustrates the transfer of bridged 802.1q VLAN frames over WAN links.

FIG. 1A is a diagram that illustrates one embodiment of the system of the present invention. The system 20 includes a number of customer networks 22, 24 and 26. In this embodiment, the customer networks are associated with the VLAN switches 28, 30 and 32. The VLAN switching changes the normal Ethernet frames into 802.1q VLAN frames. These 802.1q VLAN frames are sent to the units 34, 36 and 38. These units append the Point to Point Protocol (PPP) header, or other protocol header, and bridge the 802.1q frames to the unit 40. The unit 40 strips the PPP header, or other protocol header and other overhead from the frames and sends the stripped 802.1q VLAN frames off to other elements, such as the VLAN switch 42.

Figure 1B:
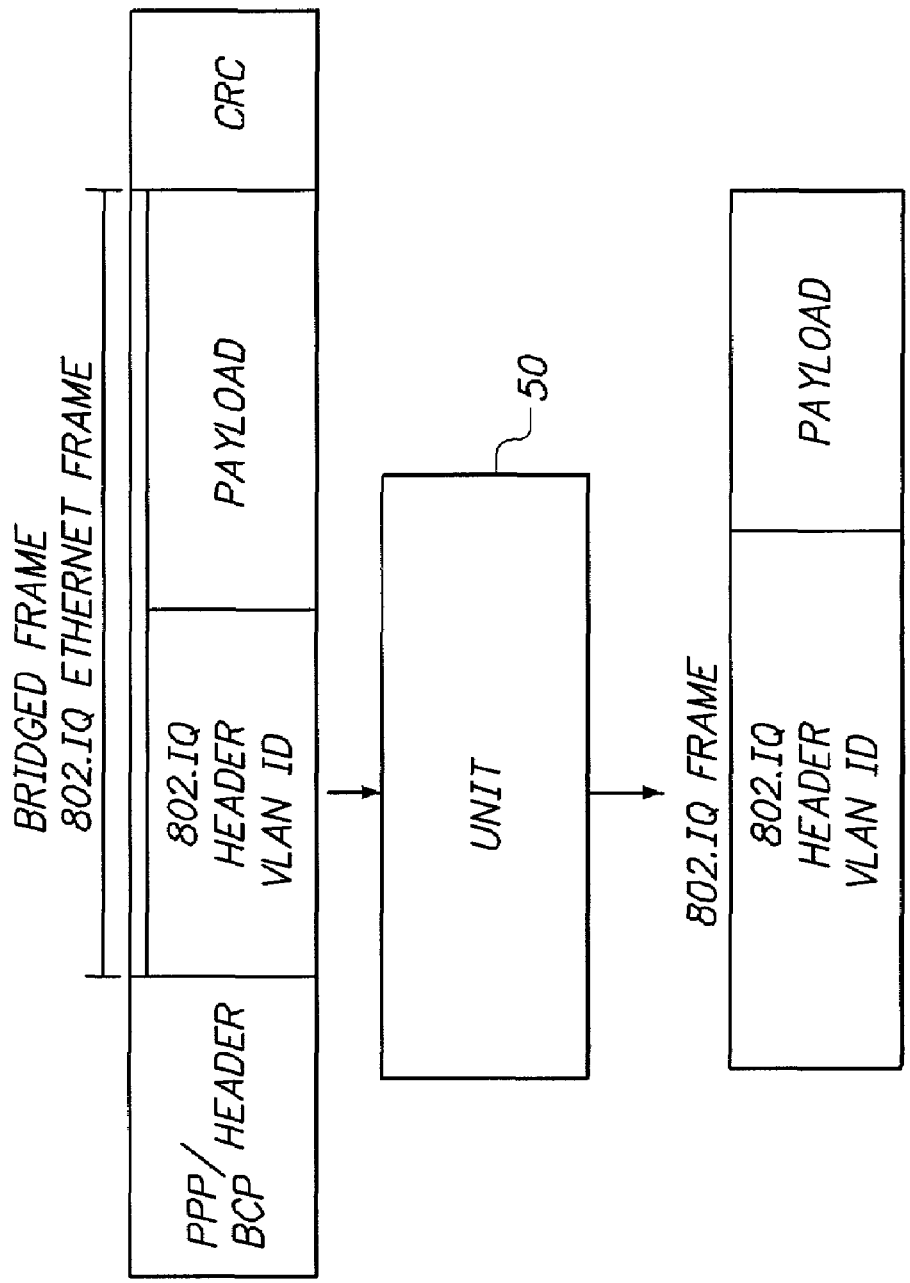
FIG. 1B is a diagram that illustrates the operation of a unit of the present invention in converting the bridged 802.1q frames into regular 802.1q frames for the system of FIG. 1A.

FIG. 1B illustrates the stripping operation of the unit 40 shown in FIG. 1. As shown in FIG. 1B, the unit 50 receives a bridge frame, containing within it an 802.1q Ethernet frame. The unit 50 strips the 802.1q frame and transmits it to additional network elements. Such a bridging operation is like the operation described in the request for comments, RFC 2878, of the network working group for PPP bridging control protocol (BCP) of July 2000. Bridging, as shown in FIGS. 1A and 1B, has a number of disadvantages. First, bridging adds overhead, in this case the PPP header, and a cyclical redundancy check (CRC) field. An additional disadvantage is that bridging does not have flexibility in controlling the VLAN ID. Furthermore, as described below, flow-based VLAN ID tagging cannot be done with bridging.

Figure 2A:
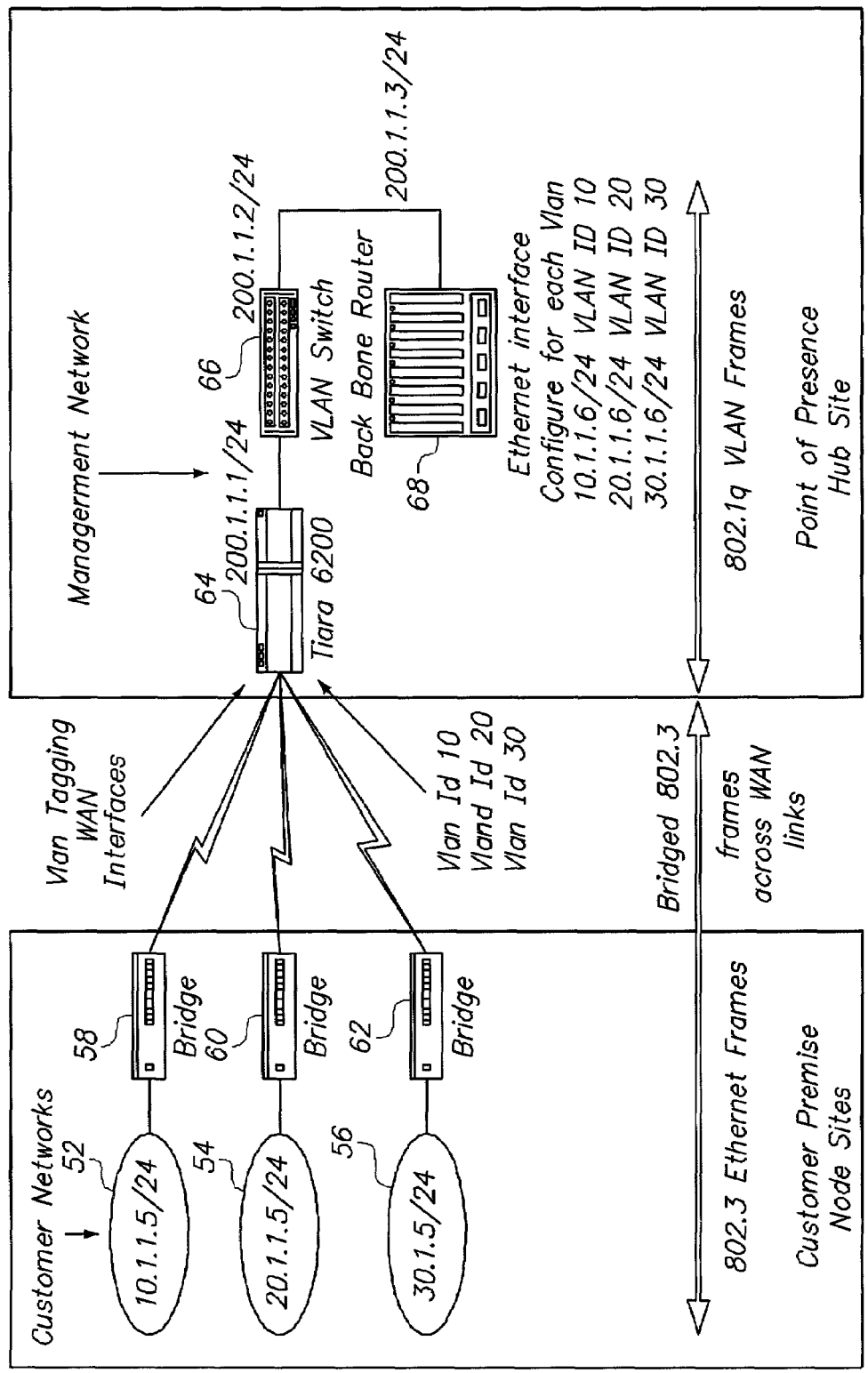
FIG. 2A is a diagram that illustrates a VLAN tagging unit which converts bridged Ethernet frames into 802.1q VLAN frames.

FIG. 2A illustrates another of the system of the present invention. In this embodiment, customer networks 52, 54 and 56 connect to bridges 58, 60 and 62. The bridges 58, 60 and 62 transmit bridged Ethernet frames across WAN links to the VLAN tagging unit 64. The VLAN tagging unit tags the data with the VLAN ID. The tagged data is sent in 802.1 q VLAN frames to a VLAN switch 66, which then can send the data to the backbone router 68. Note that as shown in FIG. 2A, data from the customer networks 52, 54 and 56 are sent to different logical interfaces at the VLAN tagging unit 64. By examining the logical interfaces of the incoming data, an associated VLAN ID can be inserted in the 802.1q VLAN frame. This is shown in FIG. 2B.

In FIG. 2B, a bridged 802.3 frame contains a 802.3 frame between the PPP header and a CRC. The tagging unit 70 examines the logical interface from which the incoming data is received (in this case, logical interface B). The VLAN table is checked, and in this case the logical interface B is associated with the VLAN ID equal to 20. The output 802.1q frame includes additional data as is shown by the VLAN table, which includes the VLAN ID=20. According to the 802.1q specification, the 802.1q frame header is implemented by including an E-Type field 72a and a VLAN ID field 72b. The E-Type field is set to 0×8100, which indicates VLAN frames. The E-Type for the payload is shifted down into field 72c. Note that the E-Type field 72c matches the E-Type field of the bridged 802.3 frame.

Figure 3A:
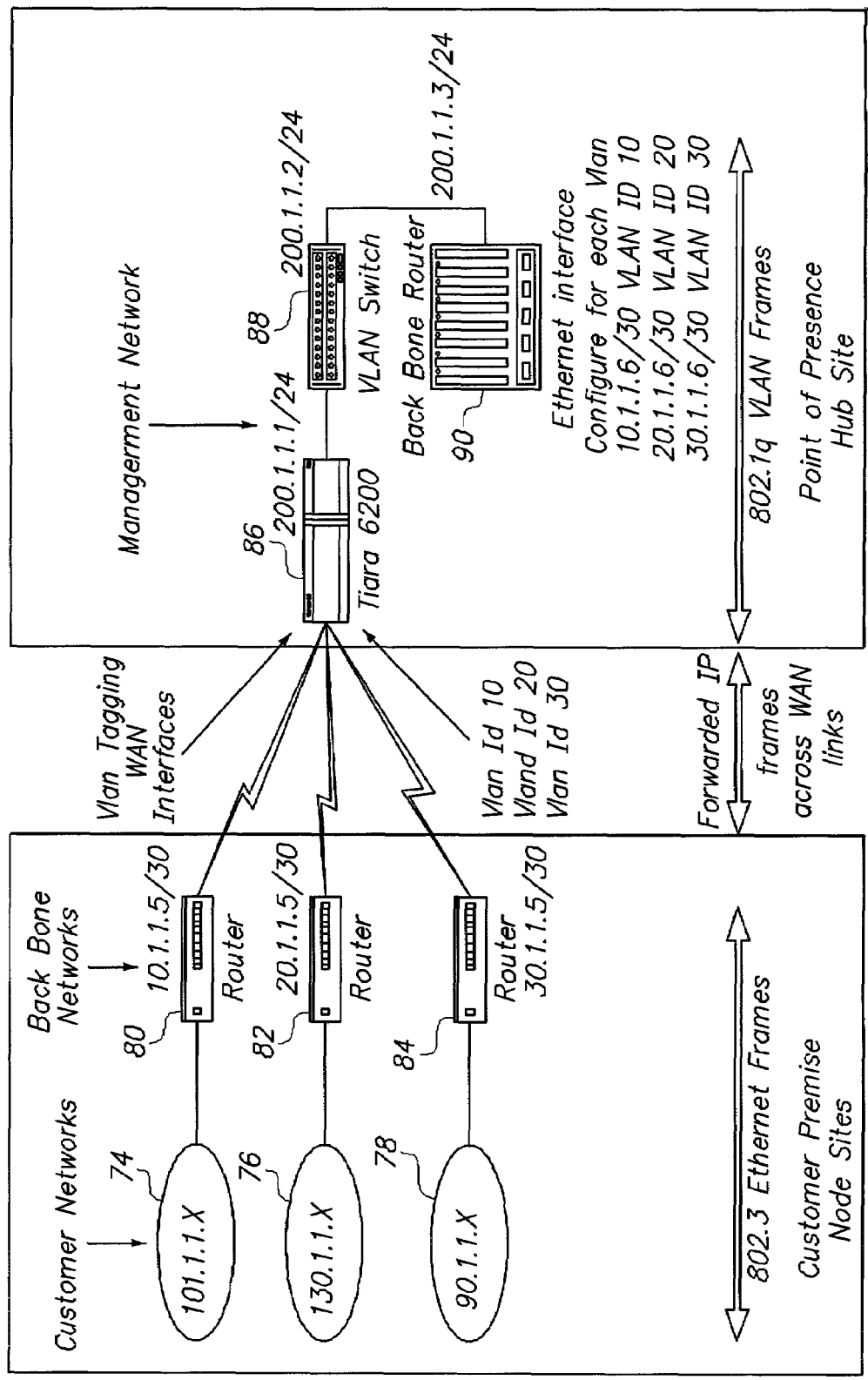
FIG. 3A is a diagram that illustrates the transmission of forwarded IP frames across WAN links being sent to a VLAN tagging unit which converts it to 802.1q VLAN frames.
Figure 3B:
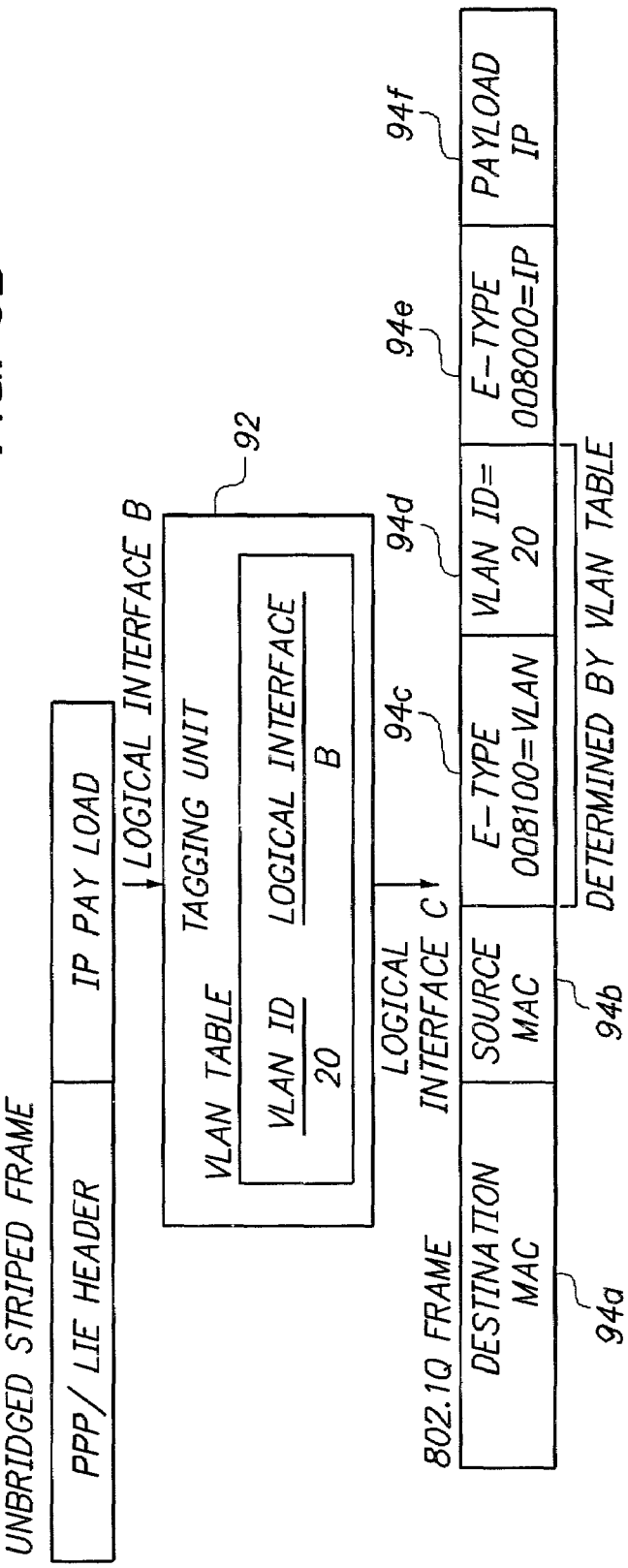
FIG. 3B is a diagram that illustrates the conversion of unbridged stripped frames into 802.1q frames for the system of FIG. 3A.

FIG. 3A illustrates customer networks 74, 76 and 78. They are connected to routers 80, 82 and 84. The router sends IP frames according to the Point to Point Protocol to the unit 86. The WAN links to the unit 86 are such that the networks 74, 76 and 78 are associated with different input WAN logical interfaces for the unit 86. Using the input WAN logical interface, the VLAN tagging unit 86 is adapted to produce 802.1q VLAN frames which can be sent to other network elements, such as the VLAN switch 88 and the backbone router 90. FIG. 3B illustrates the operation of VLAN tagging for the unit 86 shown in FIG. 3A. In this embodiment, the tagging unit 92 receives an unbridged stripped frame on logical interface B. The 802.1q frame is constructed and sent to the other units. The 802.1q frame header includes an E-Type field 94c indicating that the type is a VLAN type, and a field 94d indicating that the VLAN ID is 20. The VLAN ID is associated with the logical interface B. The destination medium access control MAC address field 94a is a preferred embodiment calculated using the destination IP address in the payload 94f. A table within the tagging unit 94 is used to determine the destination medium access control address that is associated with the destination IP address of the IP packet in the payload. The source MAC address, in the field 94b, is preferably constructed using spoofed source MAC address as described in the IP multiplexing method described below.

IP multiplexing is a method for the transparent forwarding of IP packets between a LAN and a WAN interface. LAN to LAN forwarding is accomplished through a proxy Address Request Protocol (ARP) process. A unit maps a unique spoofed MAC address to each WAN link and then responds with this spoofed MAC address when a device on the LAN broadcasts an ARP request for a remote device. These MAC addresses serves as tags for forwarding packets received on the LAN. IP multiplexing differs from bridging and switching in that it does not flood traffic and does not perform address learning. IP multiplexing devices differ from routers in that they do not appear as a router hop and they cannot be specified as a default router or gateway on a LAN. IP multiplexing is layer 2/layer 3 fast forwarding technique that forwards IP packets to Ethernet LANS and WAN connections to multiple subscribers without using routing. IP multiplexing aggregates Internet protocol traffic based on IP addresses.

Figure 4:
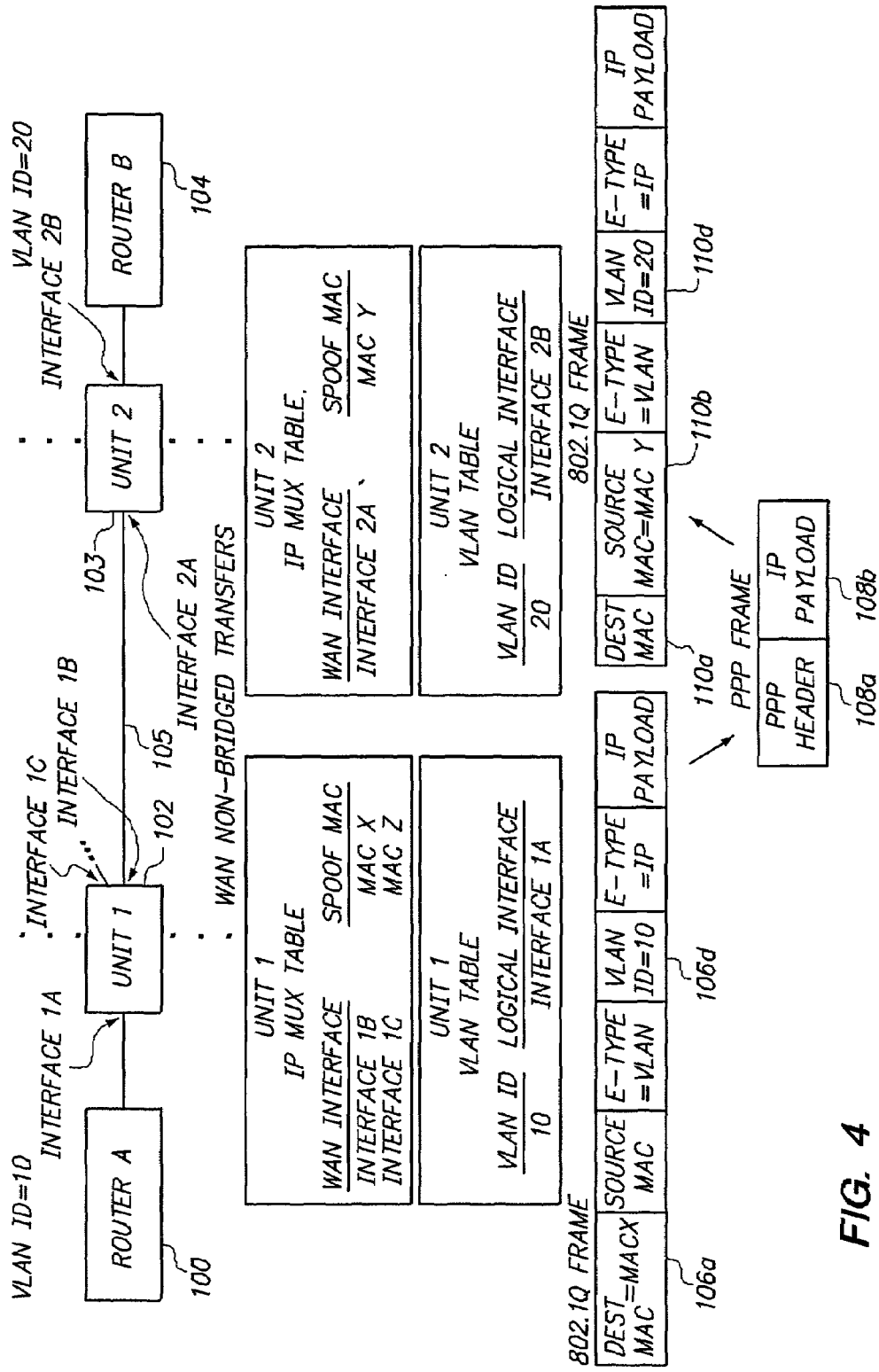
FIG. 4 is a diagram that illustrates one embodiment of how stripped non-bridging frames are transferred over a wide area network using IP multiplexing and VLAN ID tagging.

FIG. 4 illustrates the operation of IP multiplexing in one embodiment of the present invention. The router 100 broadcasts an ARP request for router 104. The unit 102 recognizes that the router B is reachable across the WAN interface 1B based upon a configured IP route. The unit 102 responds with the spoofed MAC address which is mapped to interface 1B of unit 102. In this case, the spoofed MAC address is MAC X. The router 100 then unicasts a ping echo request to MAC address MAC X. The unit 102 interprets this request to send a PPP frame to unit 103. Unit 103 checks the IP payload and transfers the ping request to the router 104. The echo reply from router 104 to router 100 is handled in the same manner.

As shown in FIG. 4, in one embodiment, a 802.1q frame can be sent to the unit 102. The 802.1q frame includes a VLAN ID field 106d, which is set to 10. The destination MAC address in field 106a is set to MAC X. The unit 102 strips the 802.1q header and sends it over the interface 1B corresponding to the spoofed MAC address, MAC X. The unit 102 transfers a PPP frame, including the PPP header 108a, and IP payload 108b, to the unit 103. The unit 103 constructs an 802.1q frame. The destination MAC address, 110a, is determined by examining the IP payload and checking the correspondence for the IP address of the router 104 with its MAC address. The source MAC address in field 110b is spoofed to MAC Y, corresponding to interface 2A, connected to the WAN bundle 105. Note that the VLAN ID in field 110d is set to 20 by the VLAN table in the unit 20. In effect, the same VLAN has different VLAN IDs in the network segment on the left of unit 102 and the network segment on the right of unit 103.

Looking at FIG. 3A, the different WAN interfaces are associated with different spoofed MAC addresses, as well as different VLAN IDs. Incoming data to the unit 86 has the spoofed source MAC field 94b corresponding to the LAN logical interface on which the data is received. The unit 86 converts the spoofed destination MAC into the correct LAN interface to transmit the data to router 80, 82 or 84.

Figure 5:
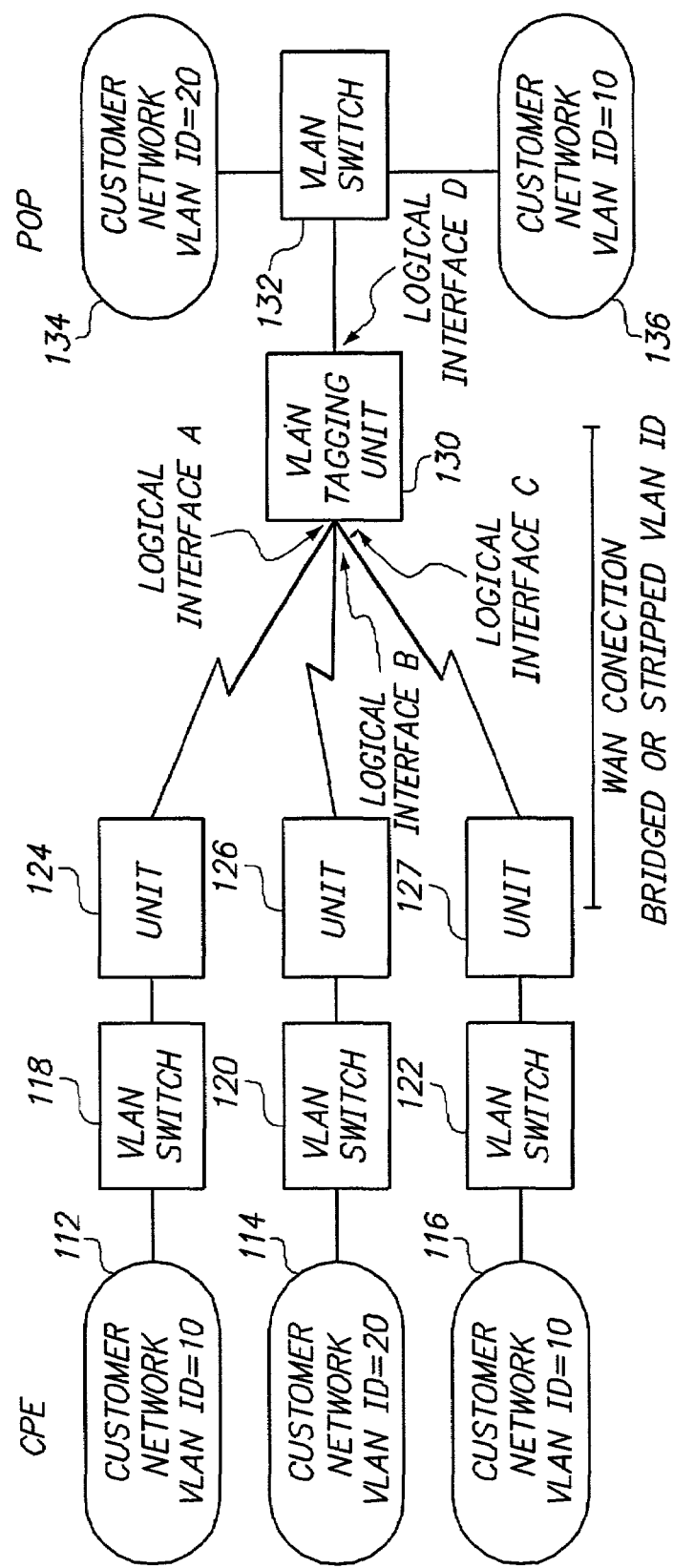
FIG. 5 is a diagram that illustrates one embodiment of the system of the present invention.

FIG. 5 illustrates one embodiment of the present invention. In this embodiment, the customer premise equipment (CPE), includes customer networks 112, 114 and 116. Customer networks 112, 114 and 116 are connected to VLAN switches 118, 120 and 122. These VLAN switches 118, 120 and 122 are connected to the units 124, 126 and 127. The WAN connections are sent to the unit 130. The unit includes a logical interface A, logical interface B and logical interface C, which correspond to WAN connections. The unit 130 also includes the logical interface D, which is a LAN network connection, such as an Ethernet connection to the VLAN switch 132. The VLAN switch 132 can send data to the correct customer networks 134 or 136, depending upon the VLAN ID.

FIG. 6 illustrates an example of a VLAN table for the VLAN tagging unit 130 of FIG. 5. The VLAN table VLAN IDs as well as the associated logical interfaces for the VLAN IDs. In this embodiment, the logical interfaces include WAN interfaces and LAN interfaces.

Looking again at FIG. 5, in one embodiment, unit 130 dynamically constructs the VLAN table. One method of doing this is by snooping on transmitted packets having a VLAN ID field. Thus as packets are received at a logical interface of the unit 130, the VLAN ID of the input data is associated with the input logical interface. This method can be implemented by using a test broadcast from the VLAN 130 to determine which units are connected to the different logical interfaces and what the associated VLAN IDs are. A number of different algorithms are available to prevent such broadcasts from flooding the system.

In an alternate embodiment, information from the VLAN tables of other units, such as units 124, 126 or 127, is transferred to the unit 130 to expand the VLAN table in the VLAN 130. Thus, in this embodiment, the unit 124 transmits that it is associated with the VLAN ID=10. Unit 127 transmits that it is associated with the VLAN ID=10, and unit 126 transmits that it is associated with the VLAN ID=20. The unit 130 sends to each of the units 124, 126 and 127 an indication that it is associated with VLAN IDs 10 and 20. In one embodiment, the VLAN units 124, 126, 127 and 130 use the logical interface over which the response is received to associate with the VLAN IDs indicated by the response. Note that such a dynamic transfer of information from VLAN tables between units requires VLAN ID assignment consistency for each portion of a VLAN (both on the right of unit 130 and to the left of units 124, 126 and 127). In another embodiment, the units 124, 126, 126 and 130 have their VLAN tables statically set.

FIG. 7 illustrates a VLAN table in which multiple VLAN IDs are associated with the same logical interfaces. In this case, flow indications such as an IP subnet, TCP port, UDP port, destination IP address, source IP address or the like is used to differentiate between the multiple VLAN IDs. This VLAN table can be used for implementing flow control as described with respect to FIGS. 15 and 16.

FIG. 8 is a diagram that illustrates a VLAN table in one embodiment. In this embodiment, the VLAN table includes the VLAN IDs, associated logical interfaces, flow indications that help distinguish VLAN IDs based on flows, and service indications, such as the quality of service translation, encryption, compression, encapsulation and the like. Different service indications affect how the data is modified. In one embodiment, the units transmit encrypted data across the WAN as indicated by an encryption indication.

The VLAN table can also include a networked address translation (NAT) indication. Looking again at FIG. 4, network address translation in the units 102 and 103 can spoof IP addresses between the two different sides of the VLAN. Thus, for example, the router 104 could have its IP address translated into another range for transmissions to the router 100. In one embodiment, a unit 102 or 103 converts from a first IP address range to a second IP address range. Network address translation can also be done to convert between the IP version 4 address scheme and the IP version 6 address scheme.

FIG. 9 illustrates a VLAN tagging unit 140. The VLAN tagging unit 140 implements the VLAN tagging as described above. The VLAN tagging unit 140 also preferably implements multi-link functions. Thus, multiple WAN connections, such as multiple T1s, can be combined together into one logical interface. Customers can obtain a larger bandwidth than that provided by a T1 alone. The T1 links are aggregated by the VLAN tagging unit 140. The VLAN tagging unit 140 also preferably implements IP multiplexing such that the WAN interconnections, such as the T1 or aggregated T1s in a multi-link are associated with a spoofed MAC address. Additionally, In one embodiment, the WAN tagging unit 140 does additional functions associated with service parameters. These functions can include, as described above, encryption, compression, translation or the like. Additionally, in one embodiment, the VLAN tagging unit 140 implements quality of service and network address translation as described above.

Logical interfaces 142 of the VLAN tagging unit include, but are not limited to, T1s, multi-link aggregated T1s, fractional T1 units, Ethernet LAN connections, virtual circuits and aggregated virtual circuits. In a preferred embodiment, the multi-link functions of the VLAN tagging unit 140 link together multiple T1s into logical WAN bundles, which are used in the VLAN tagging functions.

Figure 10:
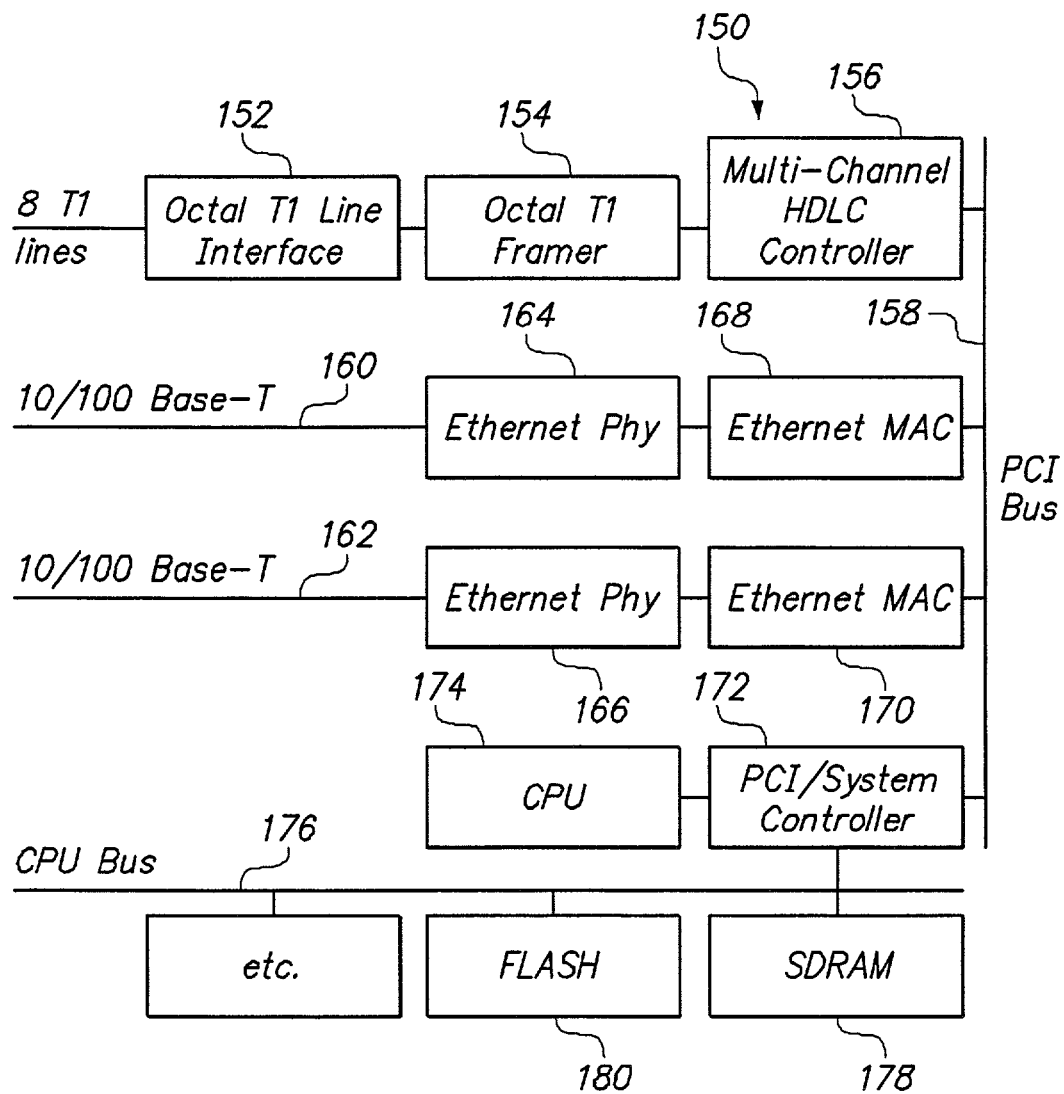
FIG. 10 is a block diagram that illustrates the VLAN tagging units of one embodiment of the present invention able to implement the VLAN tagging.

FIG. 10 is a block diagram of one example of a VLAN tagging unit 150 used to implement tagging in one embodiment of the present invention. This block diagram shows the unit connected to eight T1 lines, sending data to the octal T1 line interface 152, octal T1 frame 154, multi-channel High Level Data Link Control (HDLC) controller 156 and eventually to PCI bus 158. Other connections to the unit 150 include two 10/100 Base-T Ethernet connections 160 and 162 which connect to the Ethernet physical layer units 164 and 166 as well as the Ethernet MAC layer units 168 and 170 and eventually to the Peripheral Component Interconnect (PCI) bus 156. PCI system controller 172 is associated with a CPU 174 and a CPU bus 176. The CPU bus 176 is also connected to memory including SDRAM 178 and flash memory 180. The VLAN tagging operations are typically done by the CPU 174 running software stored in memory. Other architectures for the VLAN tagging unit can be used. The VLAN tagging units of the present invention are not limited to the architecture of FIG. 10.

In one embodiment, the VLAN tables are statically updated. The user can configure the VLAN forwarding table based on VLAN ID tags in the range 1–4095. The VLAN table consists of an association between a VLAN tag ID and all the outbound logical interfaces that the frame should be forwarded on. In one embodiment, when a VLAN frame is received by the interface software, it preferably looks up the VLAN ID in the VLAN table, and forwards the frame to all specified outbound interfaces. In the preferred embodiment, if the VLAN frame is received on an interface that is not configured for VLAN forwarding, and that particular VLAN ID is not associated with an outbound interface, the VLAN frame is dropped. VLAN frame is not transmitted on the interfaces that it is received on. Preferably the VLAN tagging units support normal IP traffic along with the VLAN frames.

In a preferred embodiment, the units are configured and managed using control instructions. In one embodiment, these instructions include a VLAN forwarding feature enable, VLAN forwarding feature disable (which preferably clears the forwarding configuration table), temporary VLAN forwarding feature disable (which disables VLAN forwarding but retains the forwarding configuration table), and VLAN forwarding enable feature (which re-enables the VLAN forwarding feature disabled in the temporary disabling step). Other commands are preferably used to allow a VLAN forwarding on a specific interface for specified VLAN ID or range of VLAN IDs. An additional command is used to remove the VLAN forwarding on a specified interface for a specific VLAN ID or range of VLAN IDs. One command changes the default 802.1q Ethernet type from the default 0×8100. A reset default command is also available in a preferred embodiment.

In one embodiment, some commands monitor the VLAN forwarding. One command displays the forwarding table for each VLAN ID. Another command displays the forwarding table for a specific VLAN ID or a range of VLAN IDs. Another command displays all VLAN forwarding statistics, and another displays the VLAN statistics for a VLAN ID or range of VLAN IDs. FIG. 11 illustrates the output of one example of the output associated with the display of the forwarding table and the forwarding statistics.

In one embodiment, some commands clear the VLAN statistics or clear a specific range in the VLAN statistics.

Additional commands are used to clear the VLAN forwarding table or clear a VLAN IDs or a range of VLAN IDs from the forwarding table.

A number of commands deal with remote system management through VLAN tag packets. With this option enabled, units can be managed inbound through VLAN tagged packets. The VLAN configuration tags are organized into the areas of enabling, VLAN management, disabling VLAN management, and configuring VLAN management specific options and VLAN management tables. For enabling and disabling VLAN management, one command enables VLAN management and another command disables VLAN management. For configuring the VLAN management's specific options, one command configures the VLAN management ID. The default VLAN management VLAN ID is 4092. One command sets the VLAN management ID back to the default of 4092. Another command disables untagged IP forwarding. Another command enables untagged IP forwarding. In the default case untagged IP packets are forwarded. Another set of commands concern the configuring of the VLAN management table. One command configures a default route for all off-network outbound traffic. Another command deletes the default route for all off-network outbound traffic. A command configures the static destination host entry in the table. Still another command deletes the static destination host entry in the table. A command configures the aging interval for all dynamic entries in the table; the default is 20 minutes. Another command puts the aging interval back to the default of 20 minutes. One command displays the VLAN management table, another clears all the dynamic entries into the VLAN management table.

Other VLAN commands include a command that assigns a VLAN ID for an interface and enables VLAN tagging for all incoming packets for that interface. Yet another command disables VLAN tagging on an interface. Additionally, a command is used to indicate whether packets are VLAN-tagged at a WAN or LAN interface by the VLAN tagging unit. Still another command clears the VLAN tagging at a specific interface. The commands described above are merely exemplary and it is known that other types of commands can be used for the VLAN forwarding and the VLAN management.

Figure 12:
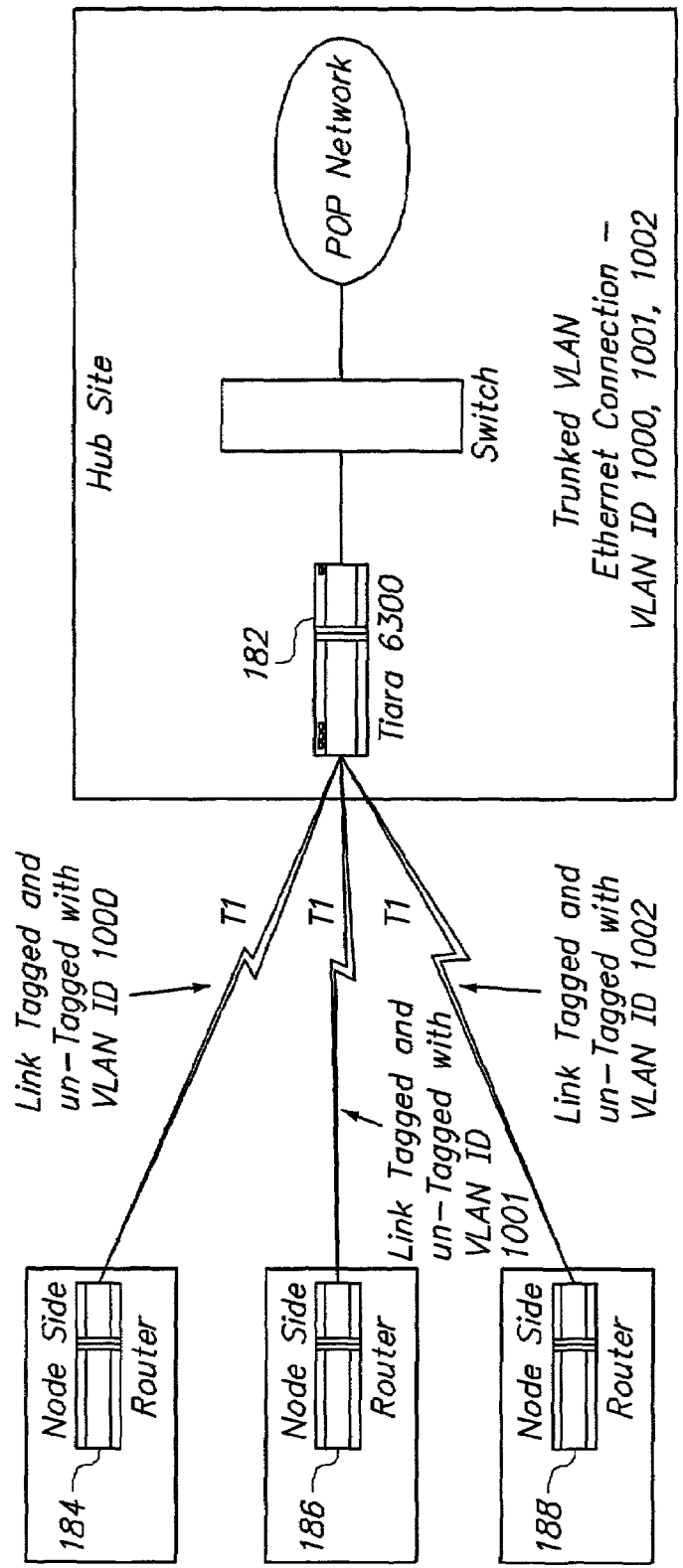
FIG. 12 is a diagram that illustrates one embodiment of a system of the present invention.

FIG. 12 illustrates a scenario in which a customer presence equipment users own their routers, which are not VLAN tagging units. In this case, the VLAN tagging unit 182 VLAN tags the incoming WAN traffic with VLAN IDs based on the incoming WAN traffic bundle. From the point of presence, the unit 182 will connect to customer router 184, 186 or 188 by a connection protocol such as point to point protocol (PPP), the multi-link point to point protocol (MLPPP), frame relay (FR), multi-link frame relay (MLFR) or HDLC. In a bridging mode, the MAC addresses are preserved over the WAN link. Thus the unit 182 is transparent between the node site and the hub site. To support routing or IP multiplexing, the spoofed MAC addresses are generated with respect to each of the WAN bundle connections and fragmentation supported.

From the node site to the hub site, the unit 182 should tag packets with configurable VLAN ID going towards the point of presence backbone. As described above, the packets are preferably tagged based upon the logical interface connection to the unit 182. From the hub site to the node site, the unit untags the packets sent to the node site. The VLAN ID indicates uniquely which logical interface, such as a WAN bundle, the untagged packet should traverse to get to the correct node site.

FIG. 13 illustrates a scenario in which customers in the same node or building can connect to the building CPE unit 190 by either an Ethernet or by a T1. If the connection is made through a T1, then the building CPE unit 190 tags the incoming LAN traffic on a per bundle basis, and forwards the packet out to the upstream WAN bundle interface of unit 192. In the scenario of FIG. 13, VLAN bridges between the unit 190 and 192 can be done. In building T1s will connect to the unit 190 according to a number of possible protocols.

In bridging mode, the MAC addresses are preserved over the WAN link and the units 190 and 192 are transparent between the node site and the hub site for both the Ethernet and in-building T1 customers. In an IP multiplexing mode, the spoofed MAC addresses are generated and fragmentation supported. For in-building T1 customers from a node site to a hub site, the unit 190 tags packets with a configurable VLAN ID going towards the backbone over the WAN link. Packets are tagged based on arriving bundle T1 interface. For in-building T1 traffic, traffic from the hub site to the node site require the unit 190 to untag VLAN packets. The VLAN ID of the untagged packet uniquely identifies the packet for the appropriate in-building T1 link.

FIG. 14 illustrates a system in which a unit 194 is connected to a network 196 within a node site 198. The unit 194 is connected by T1 line to another unit 200. Unit 200 connects across a WAN to another unit 202 at the hub site 204. In this scenario, if a connection is made through a T1, then the unit 194 VLAN tags the incoming Ethernet traffic from the tenant network 194 and forwards the packets out the WAN bundle to the unit 200. In this example, the node customer is connected by the Ethernet to the unit 194 and can be serviced by VLAN bridging between the hub site and node site. The in-building T1s using unit 194 preferably connects to unit 200 across the in-building T1 by the PPP protocol. MAC addresses are preferably preserved over the WAN link of the T1 within the node site. Units 194, 200 and 202 are transparent between the node site and the hub site for both Ethernet and in-building T1 customers. For in-building T1 customers going from node site to hub site, unit 194 tags units with the configurable VLAN ID going towards the POP backbone over the WAN link. Packets are tagged at the Ethernet interface unit 194. For in-building T1, traffic coming from the hub site to the node site will require the unit 200 to untag VLAN packets. The VLAN ID for the untagged packets should uniquely identify the packet for the appropriate in-building link.

Figure 15:
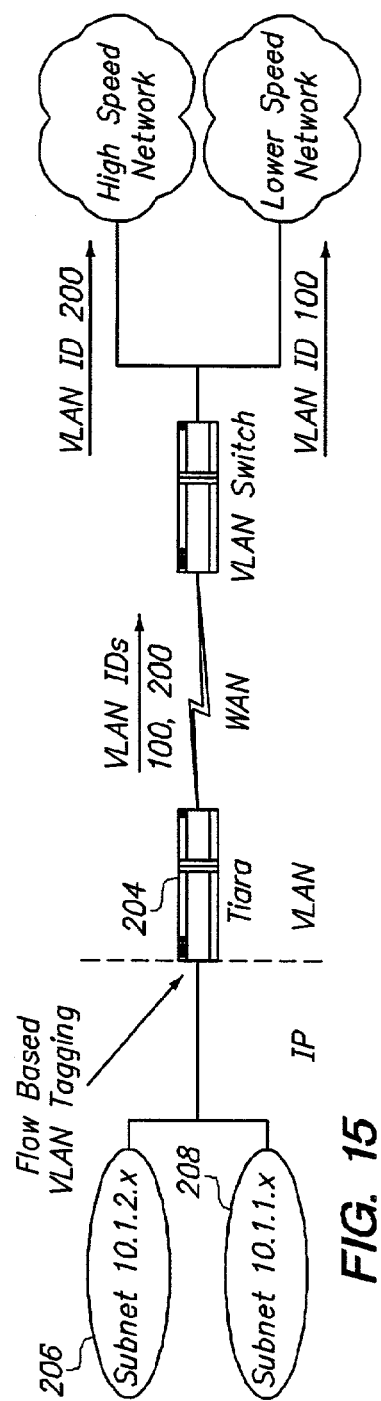
FIGS. 15 and 16 are diagrams that illustrate the flow-based VLAN tagging of one embodiment of one system of the present invention.
Figure 16:
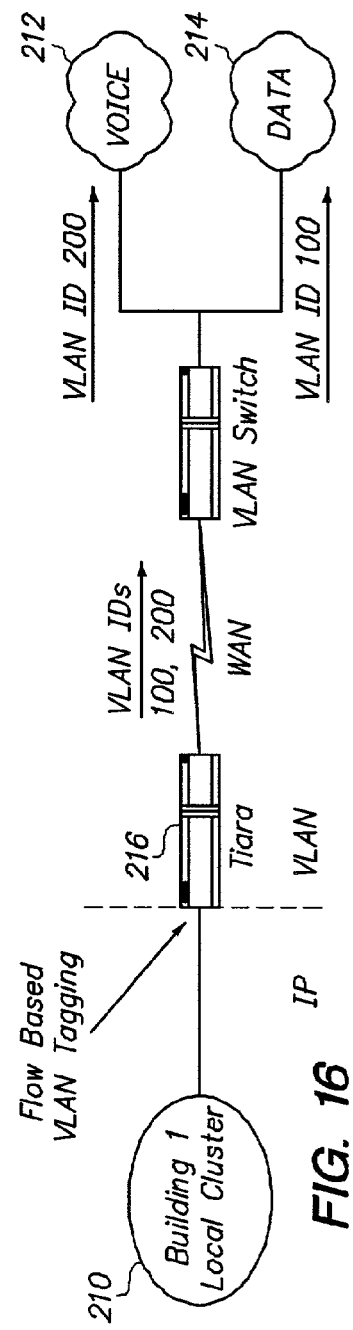

FIGS. 15 and 16 relate to flow-based VLAN tagging. In most systems described above, VLAN tagging is based solely on the logical interface. This means the various flows going into an interface all get tagged with the same VLAN ID. It is desired to have flow-based VLAN tagging in which, in addition to the interface for the unit, flow-based tagging is done. The additional data used for the flow-based tagging include tagging based upon TCP port, tagging based upon UDP port, tagging based on destination IP address, tagging based on source IP address, and tagging based on IP subnet. FIG. 15 illustrates a situation in which traffic is sent to the unit 204 from various buildings in the company. For example, the subnet 206 is associated with an engineering building, and building subnet 208 is associated with a management building. If the management building needs faster network access than the engineering building, the flows can be tagged by the unit 204 with different VLAN IDs, and the unit 204 or other units in the network can prioritize the data from the different subnets in a different fashion. For example, the data from subnet 208 is tagged with the VLAN ID 100 and data from subnet 206 is tagged with the VLAN ID 200. If the VLAN 200 gets higher priority than the VLAN ID 100, the users of the network 206 have higher priority over the users of the network 208. This provides a policy-based VLAN forwarding.

FIG. 16 illustrates a scenario in which traffic from a single building 210 is redirected based upon the type of traffic. For instance, all of the voice traffic needs to be switched to the voice network 212 whereas the data traffic is sent through the data network 214. In this example the unit 216 tags the traffic appropriately. For instance all voice traffic is tagged VLAN ID=200 and all data traffic is tagged 100. The quality service can be set up at the unit 216 such that the voice traffic is prioritized over data traffic across the unit 216 from the remainder of the network. Flow-based VLAN tagging involves classifying the flows based upon certain criteria and tagging them with the VLAN ID associated with the class. Packets are classified according to desired classes and tagged with associated VLAN ID tags. Flows can be designed upon IP addresses, ports for UDP/TCP packets (type of service bits) as well as incoming VLAN IDs. The flow-based VLAN tagging preferably uses quality of service indications to implement different features.

The flow-based VLAN tagging allows for a reduction of ports in the units because now the VLAN ID tagging need not be solely based on the interface ports. The policy-based VLAN forwarding is advantageous because the packets tagged with the VLAN IDs can be forwarded to different elements. For example, in one embodiment, VLAN IDs can be used to tag packets sent direct to a cache, such as a web cache. Additionally the VLAN IDs can be prioritized and forwarded based on a priority level.

The flow based VLAN tagging allows for a great amount of flexibility of classification. The classification can be done based on source and destination IP addresses, source and destination ports, type of service bits, as well as VLAN IDs. Also, flow-based VLAN tagging allows the possibility of retagging VLAN packets was different VLAN IDs. For example various VLAN flows can be aggregated to a single VLAN flow. Additionally the classification can be done at multiple levels. For instance the first level of classification can be based on an IP address and the second level of classification based on ports. This means that HTTP packets from one subnet gets a different VLAN ID from the HTTP packets from an other subnet In one embodiment a packet entering the unit is first classified to a particular class based on VLAN IDs, IP addresses, TOF bits and/or ports. If the packet cannot be classified into a class, the packet is discarded or added to a default class. Once the packet is classified, it is tagged based upon the associated VLAN tag. After being tagged, the packet will be VLAN-forwarded based on the VLAN forwarding table. In one embodiment, different commands can be used to set up the VLAN tagging class, display VLAN tagging class and display VLAN tagging class information.

Figure 18:
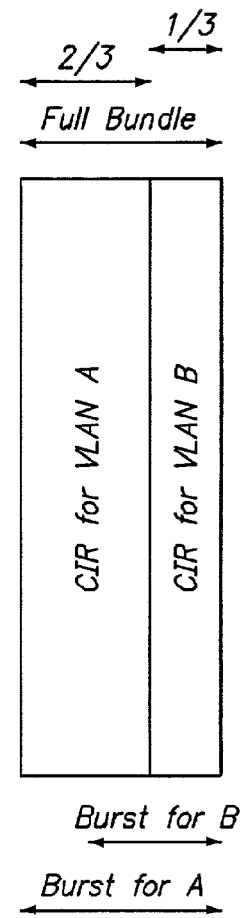
FIG. 18 is a diagram that illustrates a flow control for one embodiment for the system of the present invention.
Figure 17:
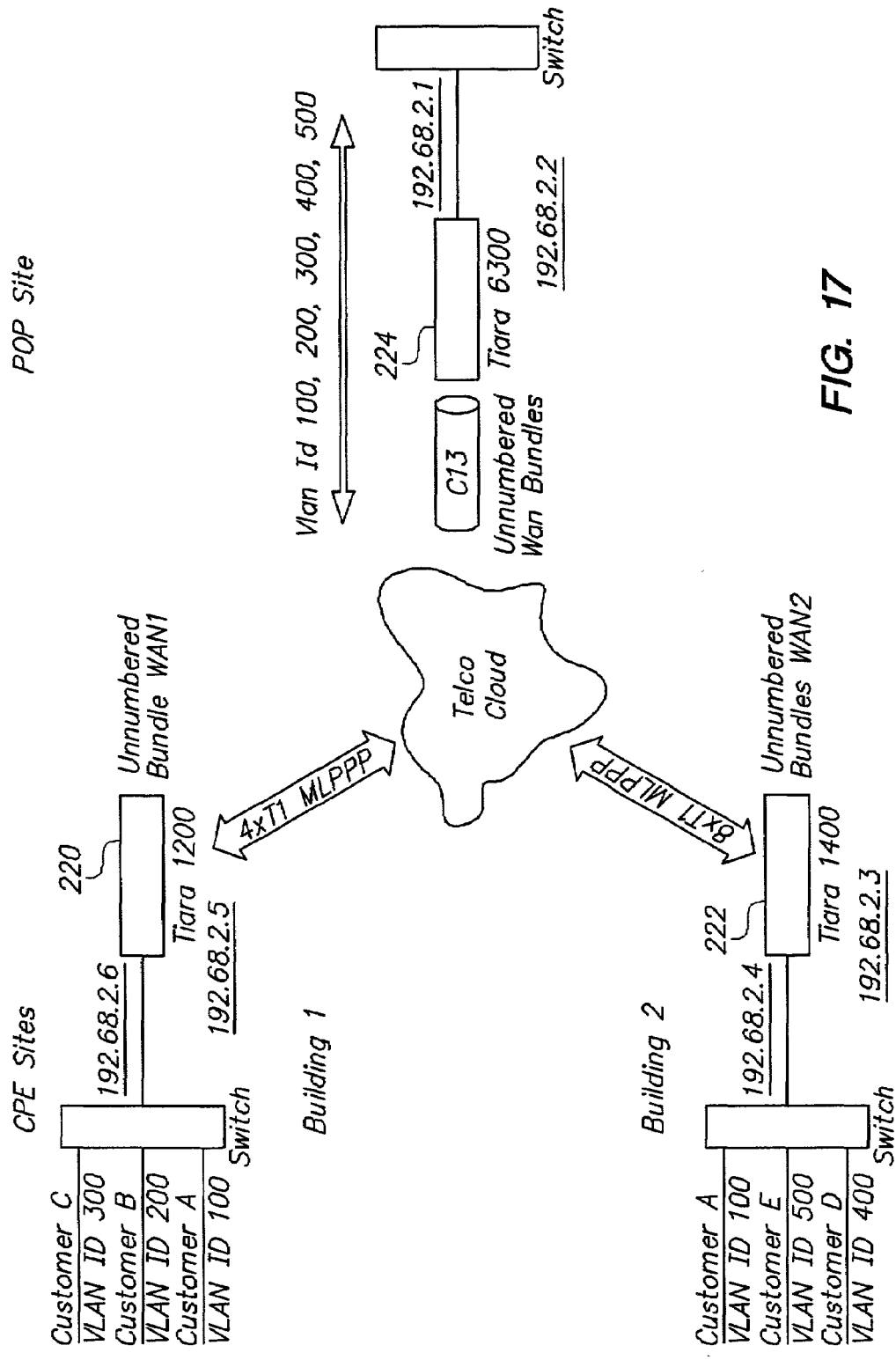
FIG. 17 is a diagram that illustrates a system using the units of one embodiment of the present invention.

FIG. 17 illustrates a system with units 220, 222, and 224 connected by WAN connections. Units 220 and 222 are connected to an Ethernet connection to local customers. The unit 224 has a LAN connection to POP equipment. Note that since multiple customers can send data through bundles, it is desirable to have the quality of service based upon the VLAN ID. In this case, for example, unit 220 can define a quality of service distinguished between two different VLAN IDs across the logical interface. In this case four T1's are multi linked into a four T1/MLPPP. In this example, the VLAN A has a committed information rate of two-thirds the bandwidth of the bundled WAN connection. VLAN D has a committed information rate of one-third the bandwidth of the bundled WAN. As shown in FIG. 18, the burst rates for the different VLANs can be different from the committed information rate to allow for bursting traffic. Other quality of service-based indications can include policing policies (that is whether to throw away data that a unit sends outside the QOS parameters), prioritization policies and shaping policies. The use of the quality of service indications prevent a single VLAN from consuming all the available bandwidth, locking out the other VLANs. To prevent any one VLAN from flooding the available bandwidth, each VLAN is preferably assigned a committed information rate and a burst rate.

In one embodiment, the Internet traffic is divided into classes. Classification based on VLAN IDs is important for this application, but other classifications can be supported as well. Each class has a committed information rate (CIR) and a burst rate assigned to it. The availability of a burst rate allows more value for the customer since the Internet traffic tends to be bursty. As long as the bursts from the different customers do not occur at the same time, each customer can enjoy more than the allocated bandwidth. Note that the classification system for QOS is preferably similar to that described above with respect to the VLAN ID classification.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

What is claimed is:

1. A VLAN tagging unit having multiple logical interfaces, different logical interfaces on the VLAN tagging unit being associated with different customer networks, the customer networks transmitting data to the VLAN tagging unit across a WAN, the VLAN tagging unit producing a VLAN ID for data associated with a customer network, the production of the VLAN ID depending at least partially on the logical interface of the VLAN tagging unit on which the data is received, the VLAN tagging unit using the VLAN ID to produce VLAN frames to sent to additional network elements and, VLAN tagging unit includes a VLAN table associating VLAN Ids and associated logical interfaces.

2. The VLAN tagging unit of claim 1 wherein one logical interface comprises a physical port.

3. The VLAN tagging unit of claim 2 wherein at least one logical interface comprises an Ethernet port.

4. The VLAN tagging unit of claim 2 wherein one logical interface comprises a T1 port.

5. The VLAN tagging unit of claim 1, wherein one logical interface comprises a DS3, CT3 or E1 port.

6. The VLAN tagging unit of claim 1 wherein at least one logical interface comprises a portion of a physical port.

7. The VLAN tagging unit of claim 1 wherein the portion of the physical port comprises a fraction al T1.

8. The VLAN tagging unit of claim 1 wherein a logical information comprises a multi link combination of multiple ports.

9. The VLAN tagging unit of claim 8 wherein the multilink combination of ports is a inultilink combination of T1 ports.

10. The VLAN tagging unit of claim 1 wherein at least logical interface comprises an virtual circuit.

11. The VLAN tagging unit of claim 1 wherein at least one logical interface comprises an aggregated virtual circuit.

12. The VLAN tagging unit of claim 1 wherein the customer networks are not associated into VLAN IDs.

13. The VLAN tagging unit of claim 1 wherein the customer networks are associated into VLANs using VLAN IDs.

14. The VLAN tagging unit of claim 13 wherein another VLAN tagging unit is used to strip the VLAN header from packets before sending it to the first VLAN tagging unit.

15. The system of claim 1 wherein the VLAN ID depends upon other information such that multiple VLAN IDs can be used for data received at the same logical interface.

16. The VLAN tagging unit of claim 1 wherein only the logical interface is used to determine the tagged VLAN ID.

17. The system of claim 1 wherein when data associated with a VLAN ID is received it is forwarded to each of the associated logical interfaces other than the logical interface on which the data is received.

18. The VLAN tagging unit of claim 1 wherein service parameters are further associated with the VLAN IDs, the service parameter affecting data passing through the VLAN tagging unit.

19. The VLAN tagging unit of claim 1 wherein data from multiple VLAN having different VLAN IDs are sent across the same WAN connection, with a quality of service indication determining how the bandwidth is divided between the VLANs, the quality of service indication associated with a VLAN ID.

20. The VLAN tagging unit of claim 1 further comprising network address translation for IP addresses based on VLAN ID.

21. The VLAN tagging unit of claim 1 wherein at least one VLAN ID is a management ID that allows the management of network elements such that elements associated with other VLAN IDs cannot access the management function.

22. The VLAN tagging unit of claim 1 wherein the VLAN tagging unit is adapted to associate flows coining to the unit into separate VLAN IDs such that elements in at least one network portion can handle the flows differently.

23. The VLAN tagging unit of claim 1 wherein the VLAN tagging unit has a VLAN table of VLAN IDs and associated logical interfaces, the VLAN table being dynamically updated during operation of the VLAN tagging unit.

24. A VLAN tagging unit having multiple logical interfaces, different logical interfaces on the VLAN tagging unit being associated with different customer networks, the customer networks transmitting data to the VLAN tagging unit across a WAN, the VLAN tagging unit producing a VLAN ID for data associated with a customer network, the production of the VLAN ID depending at least partially on the logical interface of the VLAN tagging unit on which the data is received, the VLAN ID further depending upon other information such that multiple VLAN IDs can be used for data received at the same logical interface, the VLAN tagging unit using the VLAN ID to produce VLAN frames to sent to additional network elements and, VLAN tagging unit includes a VLAN table associating VLAN Ids and associated logical interfaces.

25. The VLAN tagging unit of claim 24 wherein at least one logical interface comprises a multi-link of T1s.

26. The VLAN tagging unit of claim 24 wherein in at least one logical interface comprises an Ethernet port.

27. The VLAN tagging unit of claim 24 wherein at least one logical interface comprises a T1 port.

28. The VLAN tagging unit of claim 24, wherein at least one logical interface comprises a DS3, CT3 or E1 port.

29. The VLAN tagging unit of claim 24 wherein the customer networks are not associated into VLANs.

30. The VLAN tagging unit of claim 24 wherein the customer networks are associated into VLANs having VLAN IDs.

31. The VLAN tagging unit of claim 30 wherein another VLAN tagging unit strips the VLAN header from the data from the customer network before transmitting the data from the another VLAN tagging unit to the first VLAN tagging unit.

32. The VLAN tagging unit of claim 24 wherein service parameters are associated with VLAN IDs and the units are adapted to use the service parameter to affect data passing through the unit based upon the VLAN IDs.

33. The VLAN tagging unit of claim 24 wherein the quality of service is determined based upon the VLAN IDs.

34. The VLAN tagging unit of claim 24 wherein the VLAN tagging unit further does network address translation based on VLAN IDs.

35. The VLAN tagging unit of claim 24 wherein at least one VLAN ID is used for management.

36. The VLAN tagging unit of claim 24 wherein the VLAN tagging unit is adapted to associate flows coming through the Internet with separate VLAN IDs such that the elements in at least one network portion can handle the flows differently.

37. The VLAN tagging unit of claim 24 wherein the VLAN tagging unit has a VLAN table of VLAN IDs and associated logical interfaces, and the VLAN table is dynamically updated during the operation of the unit.

38. A system comprising: a customer network using a first VLAN ID; a first VLAN tagging unit, the first VLAN tagging unit adapted to convert VLAN frames into data in a format without a VLAN ID which is sent across a WAN to a second VLAN tagging unit; and the second VLAN tagging unit adapted to receive data in the format without a VLAN ID, the second VLAN tagging unit converting the data in the format without a VLAN ID into VLAN frames with a second VLAN ID, wherein the first and second VLAN ID need not be the same and, VLAN tagging unit includes a VLAN table associating VLAN Ids and associated logical interfaces.

39. The system of claim 38 wherein data is sent between the first and second VLAN tagging unit as datalink layer encapsulated IP packet.

40. The system of claim 39 wherein the data link connection is a point to point protocol packet.

41. The system of claim 39 wherein the packet is a multi-link point to point protocol packet.

42. The system of claim 38 wherein the second VLAN tagging unit uses the logical interface from which the data is received in order to determine what second VLAN ID to associate with the data.

43. The system of claim 38 wherein IP multiplexing is done such that the first and second VLAN tagging units associate spoof MAC addresses with WAN connections and wherein the spoof MAC addresses are provided to units on LAN connections to the first and second tagging units.

44. The system of claim 38 wherein both the first and second VLAN tagging unit uses VLAN tables that associate VLAN IDs with logical interfaces.

45. The system of claim 38 wherein the first arid second VLAN tagging units use service parameters which affect the data transferred over the WAN.

46. The system of claim 38 wherein the first and second tagging unit use a quality of service connections to distinguish between different VLAN connections.

47. The system of claim 38 wherein the first and second VLAN tagging units use network address translation based upon VLAN IDs.

48. The system of claim 38 wherein the first and second VLAN tagging units use certain VLAN IDs for management.

49. The system of claim 38 wherein the selection of VLAN IDs is used based upon a flow-based management system.

50. The system of claim 38 wherein the first and second VLAN tagging units use VLAN tables associating VLAN IDs and logical interfaces, the VLAN table being dynamically updated.

* * * * *